(No Model.)
F. J. SHEWRING.
TROLLEY CONNECTION FOR CANAL BOATS.
No. 594,913. Patented Dec. 7, 1897.
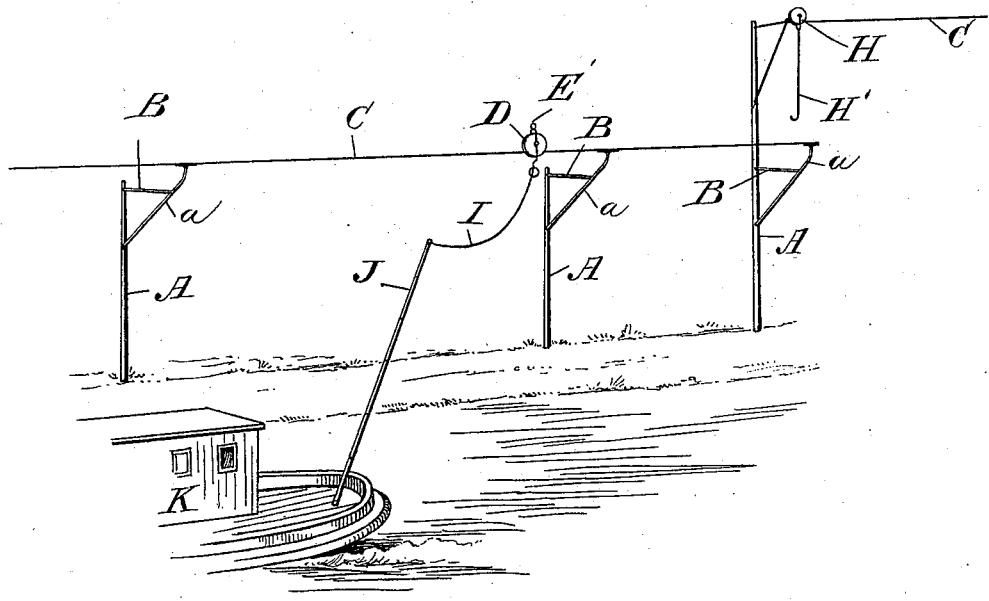
Fig. 1.
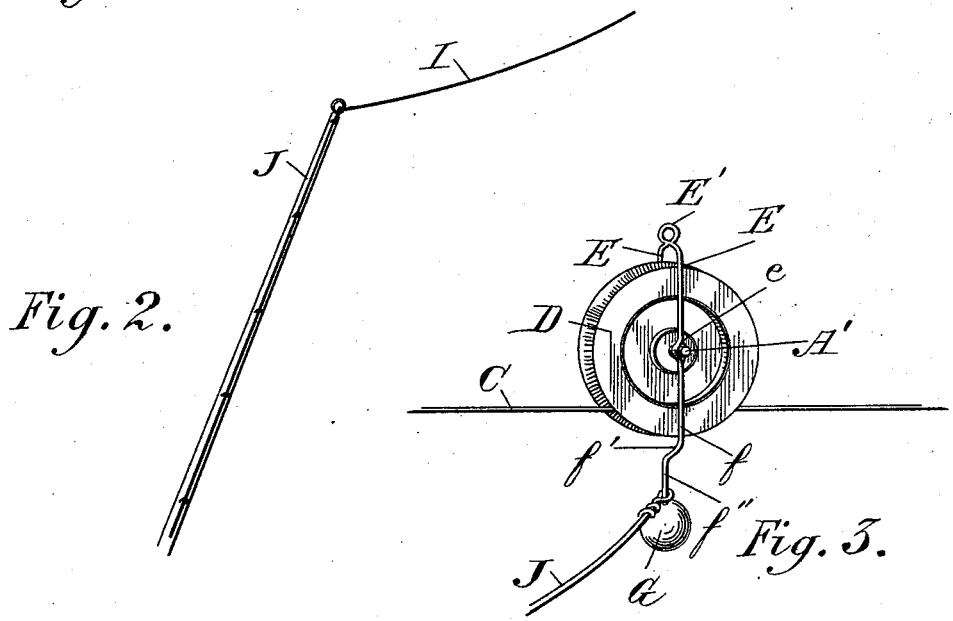
Fig. 2.
Fig. 3.
Witnesses:
Inventor:
F. J. Shewring
by C. H. Riches
his attorney

UNITED STATES PATENT OFFICE.

FREDERICK J. SHEWRING, OF TORONTO, CANADA.

TROLLEY CONNECTION FOR CANAL-BOATS.

SPECIFICATION forming part of Letters Patent No. 594,913, dated December 7, 1897.

Application filed March 11, 1897. Serial No. 627,054. (No model.)

*To all whom it may concern:*

Be it known that I, FREDERICK J. SHEWRING, of the city of Toronto, in the county of York, in the Province of Ontario, Canada, have invented certain new and useful Improvements in Trolley Connections for Canal-Boats; and I hereby declare that the following is a full, clear, and exact description of the same.

The object of this invention is to provide a canal-boat with a trolley connection which will make a practically perfect circuit between the line-wire and feeder for the motor and at the same time offer no obstruction to the successful navigation of the vessel and to so construct this trolley connection that it can be cheaply made and easily operated; and the invention consists, essentially, of providing the canal-boat with a rigid trolley-pole permanently attached to the boat, mounting on the trolley-wire a gravity-balanced trolley-wheel, and connecting the trolley-pole and wheel with a wire or electric conductor of sufficient slackness to permit of the fullest freedom of the movements of the vessel, the whole device being hereinafter more fully set forth, and more particularly pointed out in the claim.

In the drawings, Figure 1 is a view of a canal-boat, trolley-pole, overhead wires, trolley-wheel, and wire connection between the pole and the wheel. Fig. 2 is an enlarged view of the pole and slack-wire connection. Fig. 3 is an enlarged view of the trolley-wheel.

Like letters of reference refer to like parts throughout the specification and drawings.

A A represent the poles, located along the canal-bank. To the upper end of each of the poles is connected an upwardly and outwardly inclined arm $a$, extending above the top of its respective pole A and outwardly from the pole a sufficient distance to prevent any contact between the pole and the wire.

B B represent horizontal stay-rods, one connected to the top of each pole A and adapted to brace its respective arm $a$.

C represents the trolley or line wire, supported by the arm $a$. By reference to the drawings it will be noticed that the top of each of the arms $a$ is slightly curved upward into a practically vertical position to provide for the freedom of the movement of the trolley-wheel.

D represents the trolley-wheel, and A' the axle of the trolley-wheel. The axle A' is mounted in bearings $e$, formed in the lower ends of the sides E E of a vertical frame for the wheel. The upper ends of the sides E E are united, and permanently attached to them is an eye E'. The side E of the frame remote from the poles A A is provided with a downward extension $f$, depending below the wheel, then bent into a horizontal position $f'$, extending inwardly beneath the trolley-wheel, and then bent downwardly into a vertical position, the downwardly-extending part $f''$ being vertically below the trolley-wire C. Connected to the lower end of the extension $f''$ is a balance G, the purpose of which is to maintain the trolley-wheel in an upright position and cause it to remain on the trolley-wire during its travel from end to end of the same. The purpose of the vertical frame is to equalize the weight of the balance G on all parts of the wheel and at the same time prevent the balance coming into contact with the line-wire or meeting with an obstruction from the supporting-arms. At the junction of two canals it is necessary to have the trolley-wire sufficiently high to avoid any possibility of contact between the wire and the vessel or parts of the vessel passing below it and to avoid all possibility of obstruction to the masts or other elevated parts. To accomplish this, it is necessary to extend the poles at the junction of the canals to a higher elevation or to an elevation which will be above the possible elevation of the masts of the vessel and provide these poles A with arms $a$, braces B, and an elevated trolley-wire C in circuit with the main trolley-wire C at a lower elevation. Mounted upon the elevated trolley-wire C is a trolley-wheel H, having a depending rod or wire H', the lower end of which is hook-shaped to engage the eye E' of the trolley-wheel D. By this construction the trolley-wheel D can be carried across the junction of the canals and the circuit of the current maintained to the motor.

I do not confine myself to the use of this trolley connection solely for canal-boats, as I may employ it in connection with any other trolley system where the rigid trolley-pole could not be satisfactorily employed.

I represents a slack wire, one end of which is connected to the extension $f'''$ and the other end of which is connected to the trolley-pole J, fastened to the boat K, the trolley-pole being in circuit with the motor driving the propeller of the vessel.

By means of this invention a circuit can be established between the line-wire and the vessel in such a manner as to avoid all difficulties and inconveniences which might arise from the motion of the boat or the changing of direction or irregularities of the canal-bank, and also by means of this invention the use of cross-wires over the canal can be entirely dispensed with and a free channel provided for navigating the vessel.

As the motor and propeller of the canal-boat constitute no part of the present invention I do not deem it necessary to either illustrate or describe the circuit of the current and the trolley-pole.

The action of the invention is as follows: The trolley-wheel is mounted on the line-wire and a contact is formed between the wire and the wheel. The balance maintains the wheel in an upright position during its traverse from end to end of the wire, the current-circuit through the trolley-wheel through the vertical frame, and the slack wire to the trolley-pole, from whence it is conveyed to the motor. By means of the slack-wire connection between the trolley wheel and pole the rolling or rocking motion of the boat cannot be imparted to the trolley-wheel. Thus the liability of the trolley-wheel leaving the wire is greatly minimized. The trolley-pole is preferably connected to the stern of the boat and the boat in its travel draws the trolley-wheel after it along the line-wire.

By using trolley-poles of different elevations the ordinary poles along the canal-bank can be employed to carry the main circuit-wires, and the elevated poles carrying the cross or branch circuit-wires can be employed to effect a crossing at the junction of two or more canals. By this means the cost of construction can be kept at the lowest possible figure and at the same time no impediment will be offered by the crossing to retard the progress of the boats at canal junctions.

Having thus fully described my invention, what I claim as new, and desire to secure by Letters Patent, is—

A trolley system for canal-boats consisting of a main circuit-wire, a trolley-wheel mounted on the main circuit-wire, a vertical frame for the trolley-wheel, composed of two sides united at the top, an eye connected to the top of the sides, a hanger depending from one of the sides below the wheel, a horizontal extension for the hanger projecting under the vertical axis of the wheel, a vertical extension depending from the horizontal extension, a balance connected to the end of the vertical extension, a circuit-wire elevated above the main circuit-wire at canal junctions to allow of the free transit of the boats passing beneath, a trolley-wheel mounted on the elevated circuit-wire, a hanger depending from the trolley-wheel, having a hook-shaped end to engage the eye of the principal trolley-wheel, substantially as specified.

Toronto, March 1, A. D. 1897.

F. J. SHEWRING.

In presence of—
M. A. WESTWOOD,
C. H. RICHES.